US005714971A

United States Patent [19]
Shalit et al.

[11] Patent Number: 5,714,971
[45] Date of Patent: Feb. 3, 1998

[54] SPLIT BAR AND INPUT/OUTPUT WINDOW CONTROL ICONS FOR INTERACTIVE USER INTERFACE

[75] Inventors: Andrew Shalit, Somerville; Jeremy Jones, Arlington, both of Mass.

[73] Assignee: Apple Computer, Inc., Cupertino, Calif.

[21] Appl. No.: 347,593

[22] Filed: Nov. 30, 1994

Related U.S. Application Data

[63] Continuation of Ser. No. 50,510, Apr. 20, 1993, abandoned.
[51] Int. Cl.⁶ .................................................. G09G 5/14
[52] U.S. Cl. ........................................ 345/119; 395/340
[58] Field of Search ................................. 345/119, 120, 345/113, 121, 146; 395/155, 156, 157, 158, 159, 339, 340, 346, 347, 348

[56] References Cited

U.S. PATENT DOCUMENTS

| 5,008,853 | 4/1991 | Bly et al. ......................... | 395/157 |
|---|---|---|---|
| 5,065,347 | 11/1991 | Pajak et al. ...................... | 345/118 |
| 5,140,677 | 8/1992 | Flemming et al. .............. | 395/159 |
| 5,146,556 | 9/1992 | Hullot et al. ..................... | 345/118 |

OTHER PUBLICATIONS

Neil J. Salkind, Microsoft Word 4.0 for the Macintosh, 1990 pp. 196–197.
Robin Stark and Shelley Satonin, Encyclopedia of Excel, The Master Reference, 1989 Windcrest Books, p. 397.
The Andrew Toolkit–An Overview, Usenix Winter Conference, Feb. 9–12, 1988, Palay et al., pp. 9–21.

Languages for Developing User Interfaces, A Component Architecture for Personal Computer Software, Smith et al., pp. 31–56, 1992.

Larry Tessler, The Smalltalk Environment, 1991, pp. 90–106.

Gena B. Cobb, Allan McGuffey and Judy Mynhier, Word 4 Companion, Macintosh, pp. 30–42, 1992.

Robert Cowart, Mastering Window 3.1, 1992, pp. 102–143.

*Primary Examiner*—Chanh Nguyen
*Attorney, Agent, or Firm*—Cesari and McKenna, LLP

[57] ABSTRACT

An interactive user interface for a computer controlled system to simplify browsing and navigating through information structures. The interface uses a split-pane icon on a window scroll bar, or input and output icons on a window title bar. When activating the split-pane icon by dragging a selected object to it, a new pane opens up displaying the contents of the object. Where a first or second pane exists, dragging a selected object to the first or second panels input icon, or dragging the output icon of the first pane to the second panels input icon, will display the contents of a selected object in the first or second pane respectively. Other ways of controlling the displays in the same or different windows or panes are also described.

14 Claims, 14 Drawing Sheets

SPLIT BAR AND INPUT/OUTPUT WINDOW CONTROL ICONS FOR INTERACTIVE USER INTERFACE

This is a continuation of application Ser. No. 08/050,510 filed Apr. 20, 1993, now abandoned.

This invention relates to interactive user interfaces for computers, and in particular to such interfaces known as graphic user interfaces (GUIs).

BACKGROUND OF INVENTION

GUIs are exemplified by the Finder operating system used in Macintosh computers. An aspect of that system is described in U.S. Pat. No. 4,931,783, whose contents are herein incorporated by reference. That patent describes how to manipulate or control the functions available from the operating system through the use of pull-down menus. The details of how to implement such a system, as well as other Finder functions, are described in detail in "Inside Macintosh", published by Addison-Wesley. The Windows operating system for use with DOS machines is another example of a popular operating system providing a GUI. The present invention is applicable to all such systems, and is primarily concerned with accessing operating system or program functions merely by pointing and clicking and/or dragging and dropping a screen pointer under user control by manipulating a control device, usually a mouse, but can also include a keyboard.

With Finder used as a file manager, in order to retrieve an object stored on disk, you can by various manipulations ultimately view on the screen in a typical GUI active window a listing of the names of directories and of subdirectories in outline form. Also listed could be the size and last modified date next to each name. Objects representations displayed by Finder are typically directories, and files, herein referred to as "directory objects". Next to each directory name is an expansion triangle, right pointing. The contents of the directory object are not visible on the screen. To view the contents of a particular directory, you click on its triangle. The latter becomes downward-pointing, and the directory contents are displayed in the same window, which is the active window. Alternatively, if you double-click on a directory, it opens its own window and displays the names of the directory objects it contains. However, files cannot be opened in Finder, and thus it is not possible to edit the contents of a particular file directly through the Finder.

SUMMARY OF INVENTION

An object of the invention is a novel user interface for improving the ability of the user to navigate or browse through stored or computed items (aka objects).

A further object of the invention is a user interface that enables a user to view and edit the contents of an object regardless of the type of the object.

Another object of the invention is a user interface which provides views of an object in an ordered, intelligent relationship to one another for assisting a user's understanding of the window's contents.

The invention in its broadest aspect is concerned with providing means to enable a user by clicking or dragging and dropping to open up in the existing or in a new, separate pane the contents of an item or object listed or displayed in an existing pane on the screen. As an example only, the item may be a file.

In a first preferred embodiment, an icon in the form of a split-bar box is added to the normal window's or pane's scroll bar. By selecting, as by clicking on, the desired item or object in the existing pane, and dragging the item name to and dropping on the split bar box, a routine is invoked that creates a new pane on the screen, and opens up the item for display in the new pane, without affecting the display in the existing pane (other than to indicate that the contents of the item are now available).

In a second preferred embodiment, a window or pane is provided with an input icon. Dragging an item or object in a window or pane and dropping on to the input icon displays the contents of the item or object in an existing pane. This is similar to dragging an item to the split-bar box, except that when using the split-bar box, a new pane is always created.

In a third preferred embodiment that builds on the second preferred embodiment, a first window or pane is also provided with an output icon. Assuming a second pane with an input icon exists on the screen, dragging the output icon of the first pane to the input icon of the second pane will cause the second pane to be dynamically linked to and always to display the contents of whatever item is currently selected in the first pane. If the selection in the first pane changes, so will the contents displayed in the second pane. This is what is meant by stating that the second pane is dynamically linked to the first pane, namely, so that whatever is selected in the first pane will be displayed in the second pane. Multiple items may also be selected, in which case multiple items will be displayed.

A fourth preferred embodiment automatically provides an inline component editor in a window or pane for editing of the contents of the item displayed in the window or pane.

A fifth preferred embodiment combines the use of the output icon or outbox with the split-bar box. In this embodiment, dragging the output icon on a window or pane to and dropping onto a split-bar box in the same window or pane creates a new second pane dynamically linked to the original window or pane, so that whatever is selected in the first window or pane will be displayed in the second pane, with the first window or pane continuing to display its original contents.

A sixth preferred embodiment makes use of the input icon in a single window or pane. Selecting an object displayed in the single window or pane and dragging it to and dropping it on the input icon associated with that window or pane causes the contents of the selected object to replace the original set of objects on display in the same window or pane.

The advantages of the invention include a significant expansion of GUI principles for many users. In addition to other situations, it is useful to provide an improved programming environment for programmers, that will simplify access to one or more program modules for simultaneous viewing and/or editing. Moreover, the control device manipulations are easy for a user to understand, and they rapidly produce the sought after action. In addition, with the use of the input/output icons, it is possible to link and display three or more panes, each containing the lower-level contents of a higher-level previous pane.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
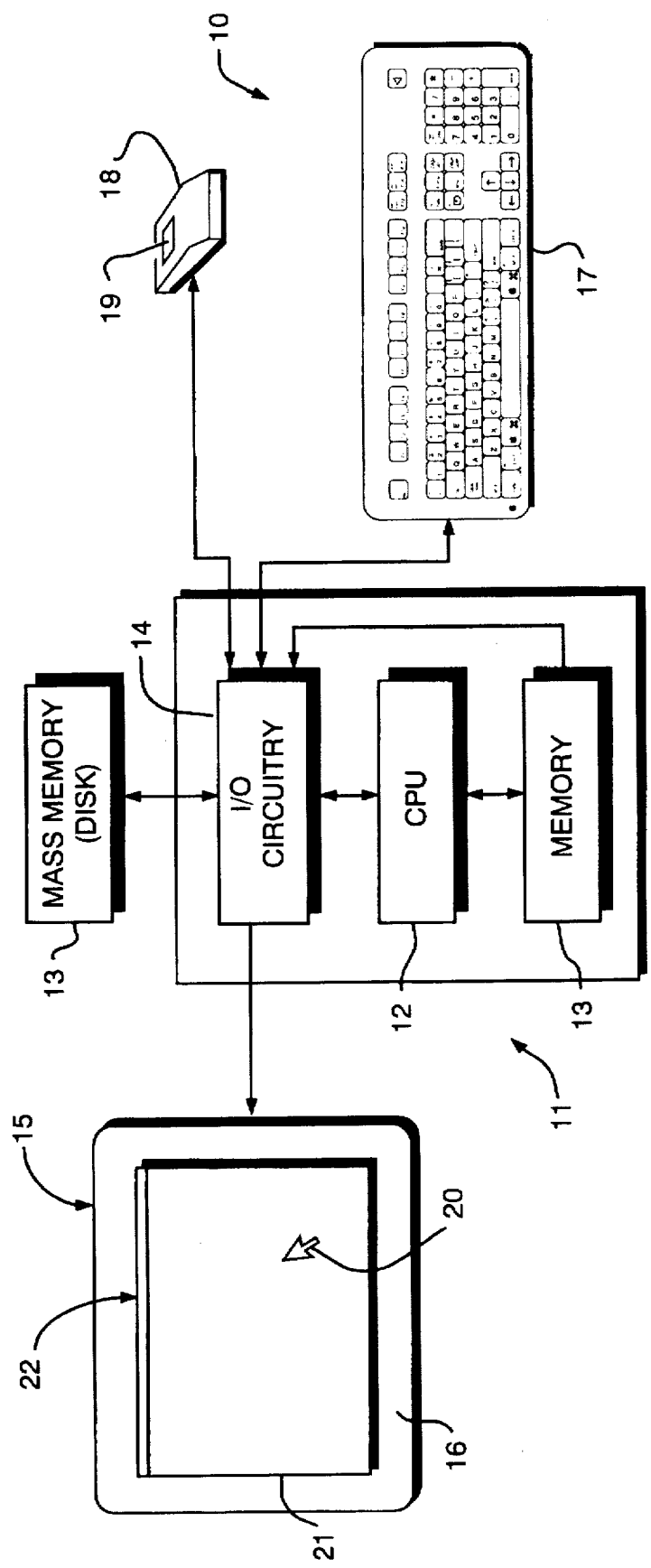
FIG. 1 is a block diagram of a typical computer system.

FIG. 1 shows a typical computerized system 10, comprising a console 11 containing a CPU 12, memory 13 in the form of RAM, ROM and disk, and I/O circuitry 14 connected to a monitor 15 having a display screen 16, and control devices in the form of a keyboard 17 and a mouse 18. The mouse 18 typically contains button switches 19 operated by a user of the system. A cursor or pointer 20 is typically displayed on the screen 16 and its position is controllable via the mouse 18 or the keyboard 17 as is well known. A typical window 21 is displayed on the screen 16, with a title bar 22 in the window.

The following terms used herein will have the following meanings.

"Object" means any representation of information or of a data structure that can be displayed on the monitor screen, and includes one or more text characters, one or more sound representations, a picture or video representation such as a video frame, in general any graphic element, and also includes a directory, a file or a database record.

"Window" means a portion of a computer screen used to display information.

"Pane" is a portion of a window. It can also include the entire window and constitute a single pane within the window. A pane or a window typically is made up of two distinct areas: a "control region" which typically contains the title or status bars or scroll bars and are always visible, and a "content region" where specific data objects are displayed and may sometimes be edited.

"Contents of an object" means a view of an object which shows the object itself, may show the pieces that make up the object, and may also include related objects or descriptions of the object (such as its size or age). These pieces may be other objects, or some other visual display. When the contents of an object are displayed, the user may be able to modify them. "Opening" or "opening up" an object means displaying the contents of an object or displaying objects that are related to the original object to allow viewing and/or editing.

"Control device" means devices manipulated by users to move cursors around a screen, and include a mouse and keyboard.

"Pointing" to an object on screen means actuating the control device to move the cursor so that it is over or adjacent the object. When the cursor is a pointer such as an arrow, it means moving the arrow tip close to the object.

"Clicking" on an object means to press and quickly release a switch on the control device, such as a button on a mouse, when the cursor is pointing to the object.

"Dragging" means to click on the object, and while holding the switch activated, to manipulate the control device to move the object to a new screen location, and then to release the switch to drop it on another object or to fix the new screen location of the object.

"Double-clicking" an object on screen is by pointing to the object and clicking twice rapidly, often used for special control purposes.

"Select" is the action of choosing an object or other user interface element, such as an icon. The action of selecting may be performed with the mouse, or through the keyboard.

A "scroll bar" is a common control device displayed in the control regions alongside a window's contention region, having, typically, at opposite ends small arrowed scroll boxes or buttons that when clicked on by the user causes the window contents to scroll.

A "button" or "box" on a scroll bar is a representation of a control device for use with a mouse.

A "thumb" is a button or box on the scroll bar, between its ends, which moves and whose location on the scroll bar corresponds to the location in the whole information of the current view.

"Icon" means any screen image or representation which upon activation by a user-controlled cursor acts as part of control means to perform a certain function. Typical icons include, for example, file representations, and boxes and buttons on scroll bars.

All of the foregoing actions described above are implemented, as is well known, under control of the computer 11, and specifically the CPU 12, by a series of software routines which are part of the operating system and which are invoked by keyboard commands, or, with a GUI, more usually by clicking on or dragging an object. The operating system knows at all times the location of the screen cursor, and routines are selected and invoked to be run by the location of the cursor when the mouse is clicked or double-clicked or released and by the state of the system. So, for example, positioning the cursor over an item displayed and clicking will select the item, if the system state allows this action. Similarly, if the system state allows it, double clicking on a directory item will display its contents.

The invention features, associated with existing windows or panes, the provision of new, user-interface, control items referred to as boxes or icons, which when invoked causes new actions to take place for the purpose of greatly enhancing the ability of a user to navigate or browse through all kinds of different objects stored in memory 13. This new behaviour of the system is brought about by the interaction of the new control items with the underlying routines under the control of the CPU, when the user carries out certain actions. Once the actions are described, and the behaviour desired described, then creating the routines to produce that behaviour is straight forward and well within the skill of the average skilled person using existing knowledge. Examples of several routines are presented hereinafter.

Figures 2A, 2B, 2C, 2D:
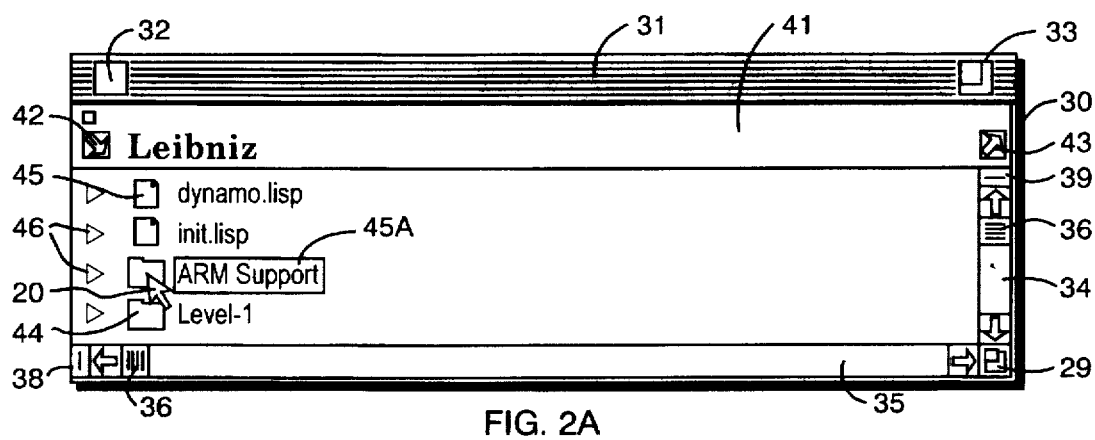
FIGS. 2A–2D; 3A–3D; 4A–4E; 5A–5C; 6–8; 9A–9E; 10A–10D are screen views showing various user interactions in accordance with the invention.

FIG. 2A shows a screen display 30 in accordance with the invention. It comprises the usual title bar 31 with a close box 32 on the left and a zoom box 33 on the right. Vertical 34 and horizontal 35 scroll bars are depicted, with the usual scroll arrows at opposite ends, and a thumb 36. A size box 29 is also shown in the lower right corner of the window.

In accordance with the invention, a horizontal split-bar box or split-pane icon 38 is provided at the left end of the horizontal scroll bar 35, and a vertical split-bar box or split-pane icon 39 is provided at the top end of the vertical scroll bar 34, the split-bar boxes functioning to split the window into old and new panes, or to split a pane into old and new subpanes. In addition, a second title bar 41 is provided below the regular title bar 31, and at its left end an input icon 42, with an arrow facing in, and at its right end an output icon 43, with an arrow facing out.

The operation with these new control icons will now be described from the user's standpoint, and the implementation of the operations will be later explained.

The window 30 shows a listing of four directory objects in the directory named Leibniz. Two names are shown, with an icon 45 representing a text file, and two names are shown with an icon 44 representing a sub-directory, and with right-pointing triangles 46 indicating that the named object's contents are not displayed.

In the window 30 shown in FIG. 2A, the user by manipulating his mouse 18 has pointed with his pointer cursor 20 to the third listed object named ARM Support and clicked on it. This action selects the object, indicated by highlighting 45A. While holding down the mouse button, the user drags 47 (FIG. 2B) the file name to the horizontal split bar box 38 (FIG. 3B), and releases the mouse button. That action causes a routine to execute which forms in the original window 30 a first pane 50 with the contents of the original window 30, and creates a new second pane 51, both under the original top title bar 31. The original window can also be thought of as one large pane. What is displayed in the first pane 50 are the objects that occupied the area now occupied by the first pane 50. Objects originally displayed where the new second pane 51 exists are truncated. The original sub-title bar 41 has also split into old 41A and new 41B title bars for the old and new panes. Both panes 50, 51 contain its own horizontal 52 and vertical 53 scroll bars, horizontal 54 and vertical 55 split bar boxes, and input 56 and output 57 icons. However, the contents of the second pane 51 is a display of the contents of the selected object, ARM Support, which is the title 59 in the second pane. Note also that the contents happens to be a further listing of text documents shown by name as indented under ARM Support. And, the downward-pointing triangle 60 indicates that the directory's contents are displayed in that second pane 51. Thus, activation of the split bar box 38 created a new pane 51 holding the contents of an item or object, in this case a directory ARM Support, selected 45A in the original window 30. The name "split bar" was chosen to indicate to the user that the control box when activated splits the original window into two panes, with one pane displaying the contents of an item selected in the other pane.

When you want to view the contents of an object, you have three choices: (1) you can open the object in its own special window with the prior art Finder; (2) you can open the object in another pane as described above and below in accordance with the invention; (3) you can open the object inline, by using the triangles, in accordance with an aspect of the invention described below and illustrated in FIGS. 5A–5C.

While split-bar or similar icons were used in the prior art, they did not control what was displayed in the second pane. For example, with text on the screen, activating the prior art vertical split-bar icon by dragging to a new screen location would form two new panes, with the upper pane displaying the upper half of what was displayed on the original screen, and with the lower pane displaying the lower half of what was displayed on the original screen. Thus, in neither of the new panes created can the displayed contents be controlled. In the invention, in contrast, what is displayed in the new second pane is the contents of what was selected by and is thus under the control of the user in the original single pane.

FIGS. 3A–3D are a set of similar views showing the action of the second preferred embodiment. In this case, the starting point is a window 64 split into two panes 65, 66 each with the same structure as depicted in FIG. 2D. Here, as in subsequent figures, the same reference numbers indicate the same elements as in the drawing figure where originally introduced. In the left pane 65, the user has selected, again, the object ARM Support, by pointing and clicking, to highlight 45A the name. Now, the user drags 67 (FIG. 3B) the selected name to the input icon 56 in the right pane 66. Upon releasing the mouse button, the second pane 66 (FIG. 3D) now displays the contents of the selected object, as in FIG. 2D. If desired, it is possible to highlight the output icon 57 of the left pane and the input icon 56 of the right to show to the user that the selected object contents have been outputted to the right pane which now displays its content, as before.

If the right pane 66 had, for example, been displaying another set of objects, then the result of the actions taken in this embodiment will cause the display in the second pane 66 to change to that of the contents of the object selected in the first pane 65.

Figure 3A:
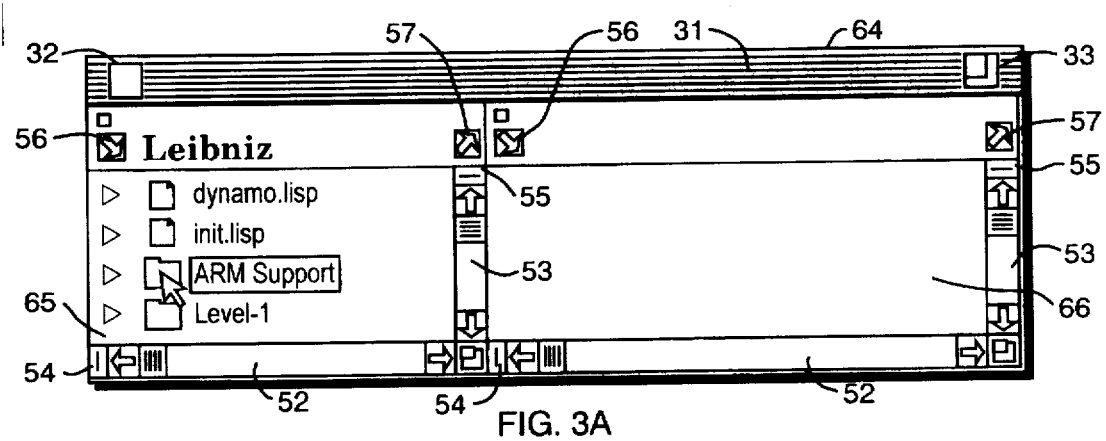
Figure 3B:
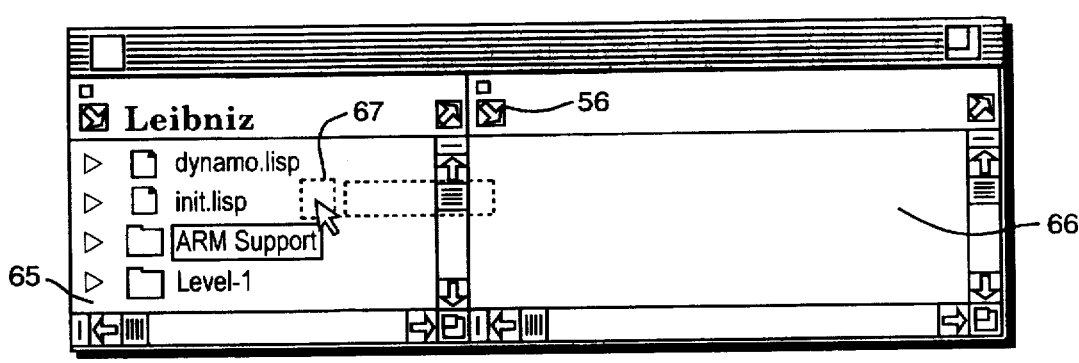
Figure 3C:
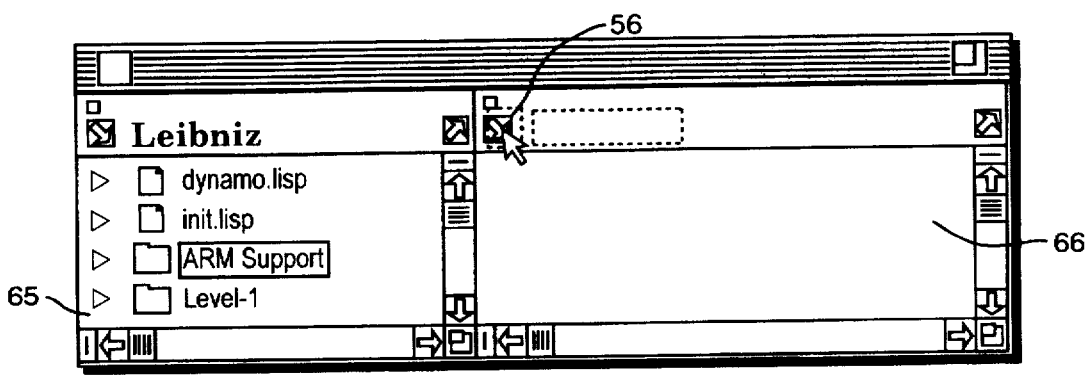
Figure 3D:
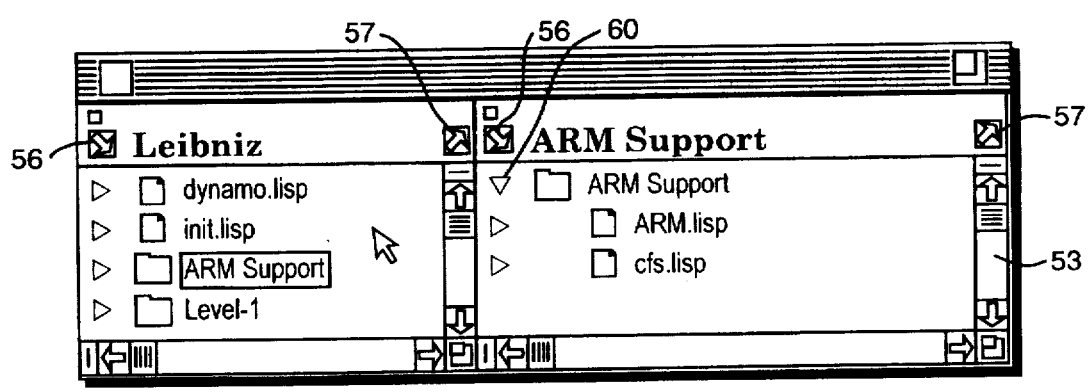
Figure 4A:
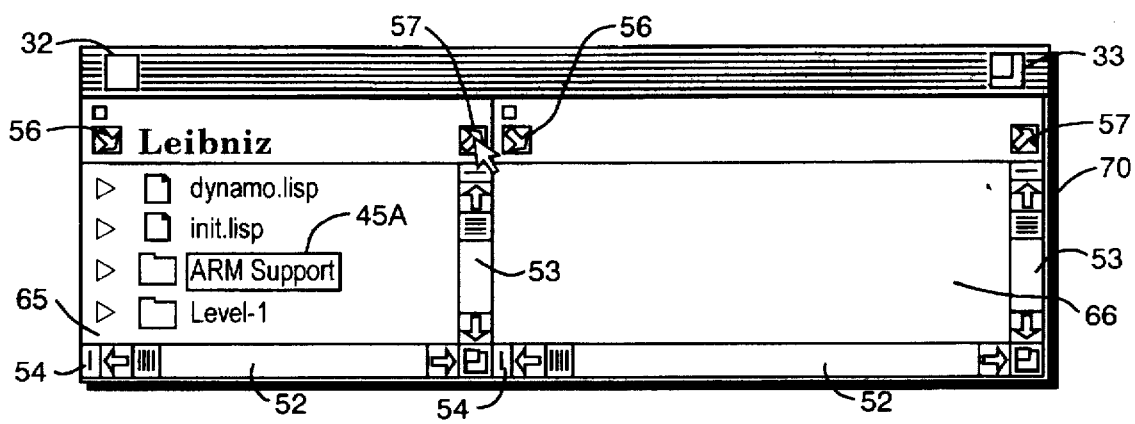
Figure 4B:
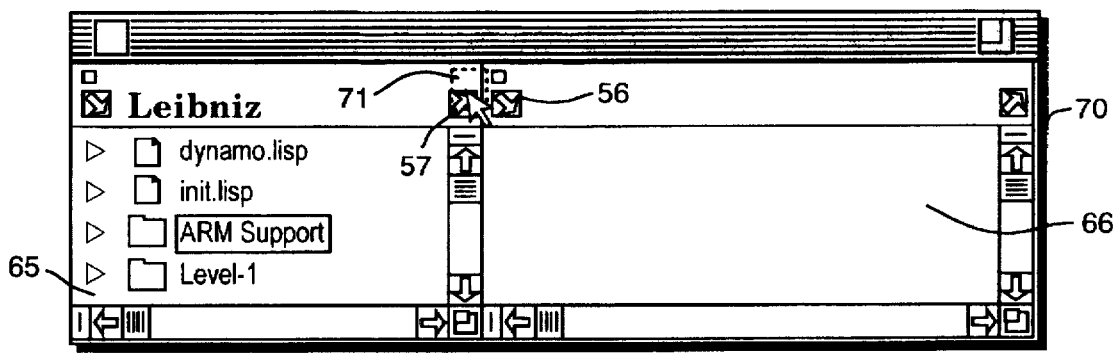
Figure 4C:
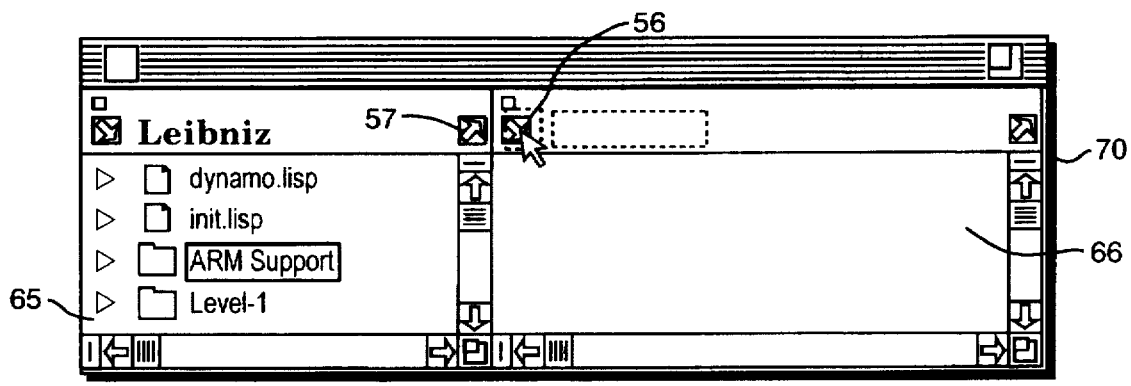
Figure 4D:
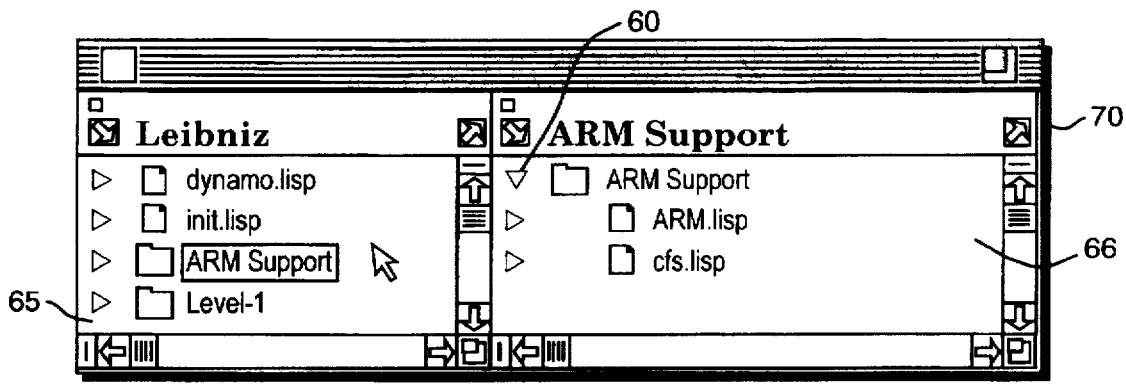

FIGS. 4A–4E shows the third preferred embodiment. As in the FIGS. 3A–3D embodiment, the starting point is a window 70 with two panes 65 and 66, with the object contents of Leibniz displayed in the left pane 65, and one object ARM Support selected and highlighted 45A. The user manipulating his mouse now clicks on the output icon 57 of the left pane 65 and drags it 71 (FIG. 4B) to the input icon 56 of the right pane 66 (FIG. 4C) and then releases the mouse button. This action opens up the selected object, ARM Support, and displays its contents in the right pane 66, with the downturned rectangle 60 showing to the user that the contents are displayed (FIG. 4D).

Figure 4E:
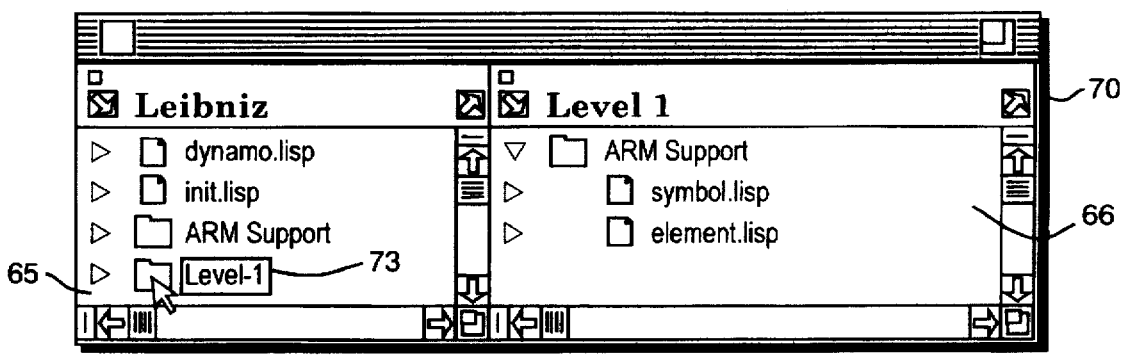

This embodiment differs from the FIGS. 3A–3D embodiment in that the second pane is dynamically linked to the first pane and continues to display the contents of the initially selected file until a new selection in the first pane is made in which case the contents of the new selection are displayed in the second pane. This is illustrated in FIG. 4E, which shows a new selection 73 of the Level-1 file in the first pane 65, and the display in the second pane 66 correspondingly changes to show the contents of Level-1, replacing the contents of the previous selection ARM Support. The display will remain unchanged until the window 70 is closed, or the left or right pane 66 is closed. In the embodiment, shown in FIGS. 4B, and 4C, it is preferred to highlight the left pane output icon 57 when dragged and the right pane input icon 56 when the mouse button is released to show to the user the link between the two panes.

Figure 5A:
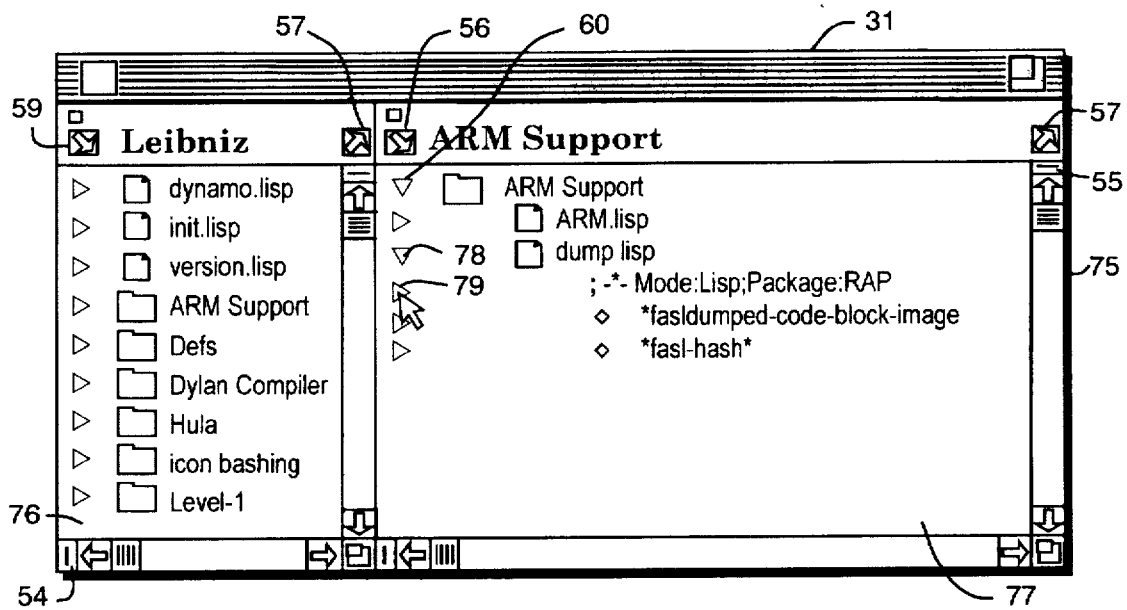
Figure 5B:
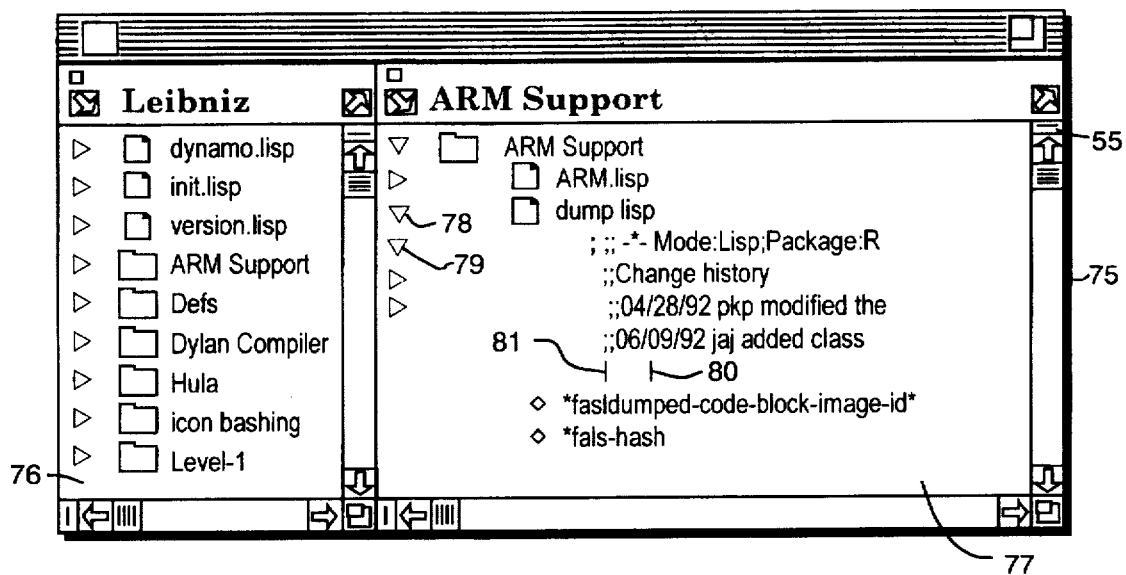
Figure 5C:
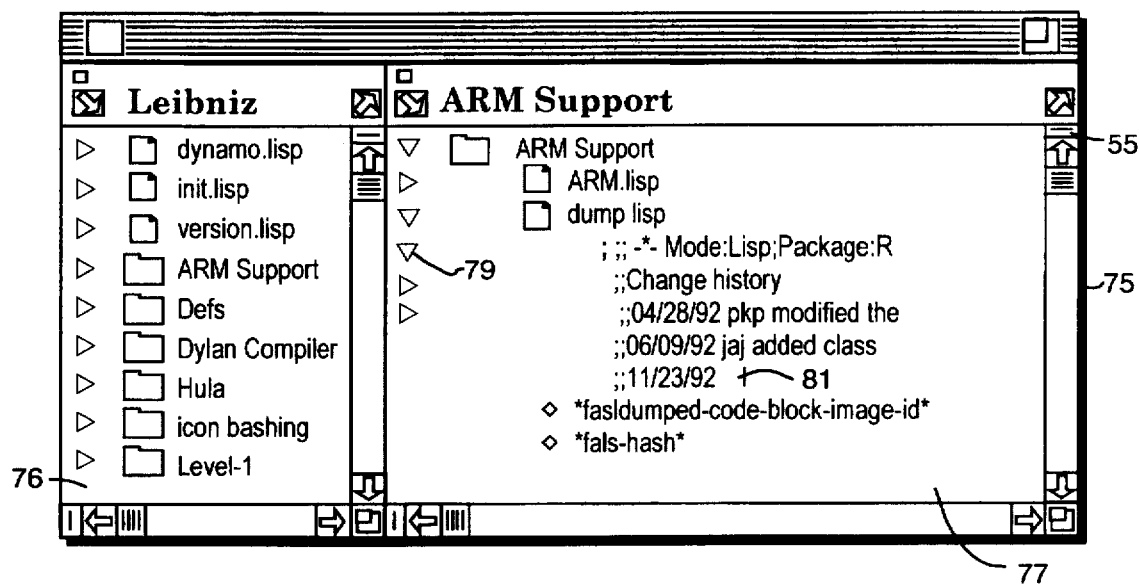

In the FIGS. 5A–5C embodiment, the window 75 contains as before a left pane 76 and a right pane 77. The contents of object Leibniz is displayed in the left pane 76. ARM Support had been opened in the right pane 77. This could be accomplished by any of the processes described in connection with FIGS. 2A–2D, 3A–3D, and 4A–4E. The feature illustrated here is to automatically provide an editing function in the new pane 77, separately claimed in the related case.

In the embodiment of the invention shown in FIGS. 5A–5C, the down-turned triangle 60 (FIG. 5A) shows that object ARM Support has been opened inline, and the contents of ARM Support (2 files) are displayed in the same right pane 77. The down-turned triangle 78 next to the dump lisp file (FIG. 5A) shows that that file has also been opened inline in the same pane 77, and contains 3 text objects. FIG. 5A shows the contents of dump lisp as three (indented) text objects, and also shows the user pointing 79 to the triangle of the first text object to select it.

FIG. 5B shows that the item indicated as open in FIG. 5A has opened inline in pane 77, and again indented, the contents of that first text object which are displayed below it, with the down-turned triangle 79 showing its display, and with the pointer 79 replaced by an editing I-beam cursor 80 which has been clicked to locate a blinking vertical line 81 as the insertion point for new text. FIG. 5C shows that a line of new text has been added by the user to the first text object. All of the normal edit functions are available in the new pane. If a third or more panes were opened with the contents of a file in the second 77 or any preceding pane then they, too, could automatically be provided with an inline component editor and activated when the cursor is positioned in the pane and assumes the edit I-beam shape and the user clicks the mouse. By an "inline component editor" is meant an editor which exists within a pane, rather than taking up an entire pane or entire window. The editor is a device which allows you to view and modify data. A single pane may contain several inline component editors, possibly of different types. A different type of editor means it is for editing different kinds of data, or editing in different formats. For example, one could have a text editor, a picture editor, fill-in-the blanks form editor, etc. The illustrations in FIGS. 5B and 5C each show an inline component editor for editing text in the righthand pane.

In the preceding examples, the new panes were split horizontally from an existing pane. That would be the normal result of using the horizontal split bar 54. Using the vertical split-bar 55 would cause vertical panes to be formed that would function in exactly the same manner as the horizontal panes. Thus, for example, dragging an output icon from a top pane to the input icon of the bottom pane would cause the selected items in the top pane to open up and be displayed in the bottom pane.

It will also be understood that highlighting a selection, or highlighting the linked output/input icons, can also be accomplished through the use of a color change.

While the split-bar icon has been located on the scroll bar, and the input and output icons on the title bar, it will be understood that the invention is not limited to those locations of the icons. They can be located anywhere on or inside a pane or window, and the appropriate software easily modified to detect clicking or dragging on the icon wherever displayed on the screen.

Also, while the use of the split-bar icon has been illustrated in connection with a window containing a single pane, as indicated, for example, in FIG. 2C, it can be made operative in a pane of a window to split the pane into two sub-panes and in general whether one or more than one pane is present.

In the examples given, the input icon is used to control what is displayed in a pane, illustrated, for example, in FIGS. 3A–3D, where activating the input icon 56 of the second pane 66 displays in pane 66 the contents of the ARM Support object. The output icon is used primarily to transfer information from the pane where activated to another pane. Thus, in FIGS. 4A–4E, the contents of an object in the first pane 65 are transferred and displayed in the second pane 66. Also, in FIG. 4C, the highlighting of the output icon 57 indicates the current selection of the highlighted object ARM Support.

It is also noted that the invention is not limited to selecting a split-bar icon in a pane or window that also contains the selected object, to split that pane or window. The invention also applies to selecting an object in a first pane displayed on the screen, dragging the object to the split-bar icon in a second pane in the same or a different window displayed on the screen, with the result that the second pane splits into two sub-panes, with one sub-pane displaying whatever was displayed in the first pane, and the other sub-pane displaying the contents of the selected object. Also, the invention is not limited to selecting a single object, but can also be applied to multiple objects selected and dragged to a split-bar icon for displaying the contents of all of the selected objects.

Moreover, the use of a split-bar icon can be combined with that of an output icon. For example, by selecting an output icon in a first pane, and then selecting a split-bar icon in a second pane, which can be the same pane or a different pane from the one containing the output icon (and the panes can also be in different windows), the second pane containing the selected split-bar icon splits into two panes. One of these displays whatever was displayed in the second pane, and the other displays the contents of the selection in the first pane. Moreover, the two panes are dynamically linked so that, as the selection in the first pane changes, the display in the new pane changes. As before, selection can be performed by selecting an output icon with a mouse, dragging until the mouse is over the desired split-bar icon, and then releasing the mouse. The net result is splitting a pane while simultaneously linking it to another pane.

Figure 9A:
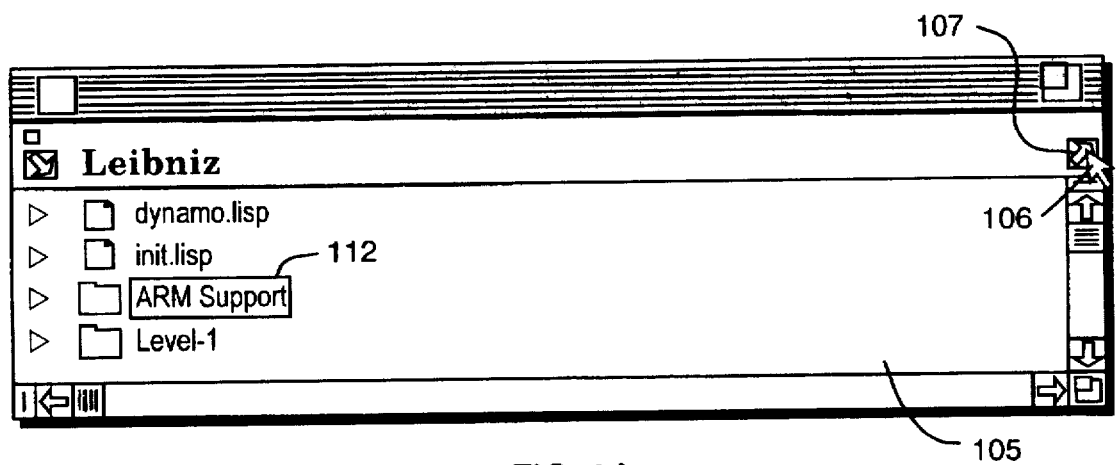
Figure 9B:
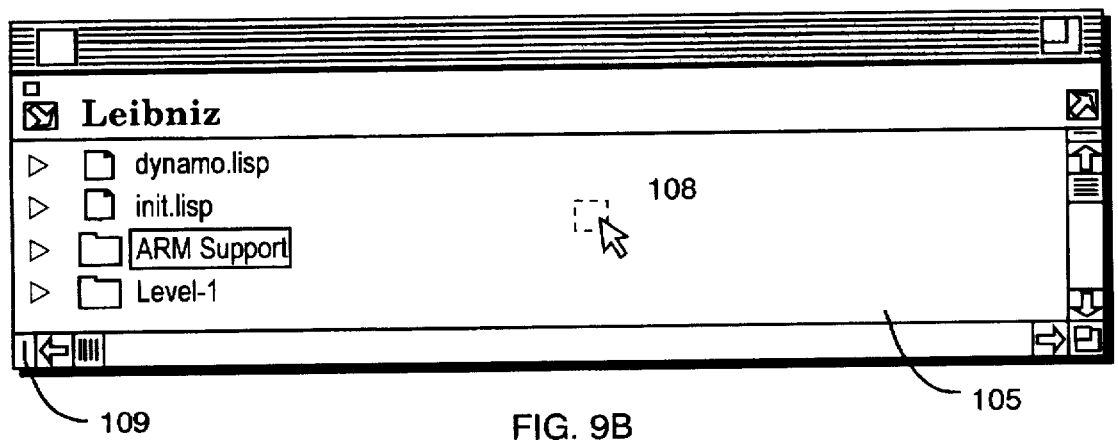
Figure 9C:
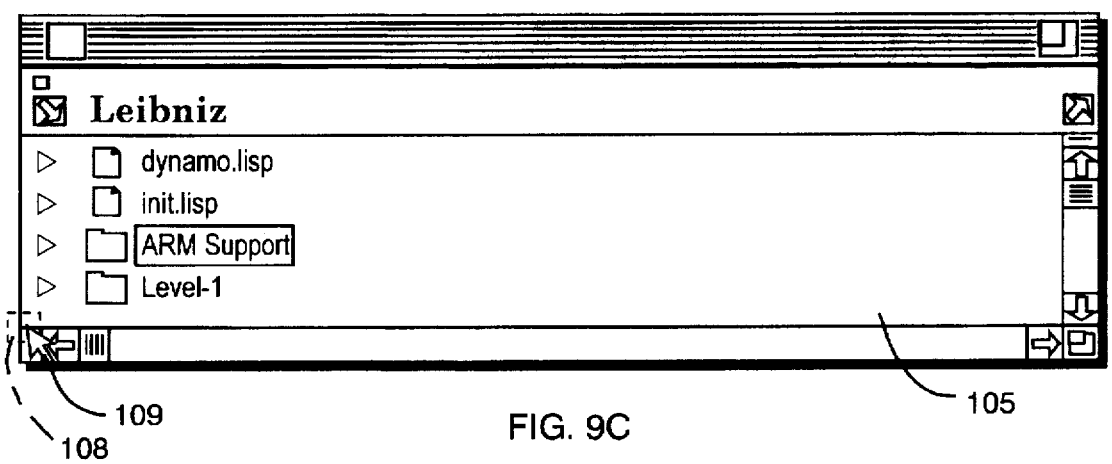
Figure 9D:
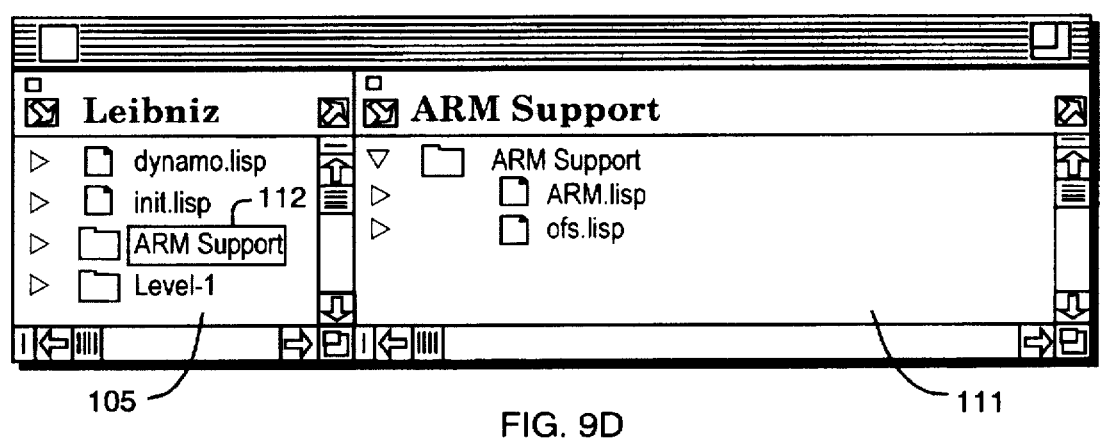
Figure 9E:
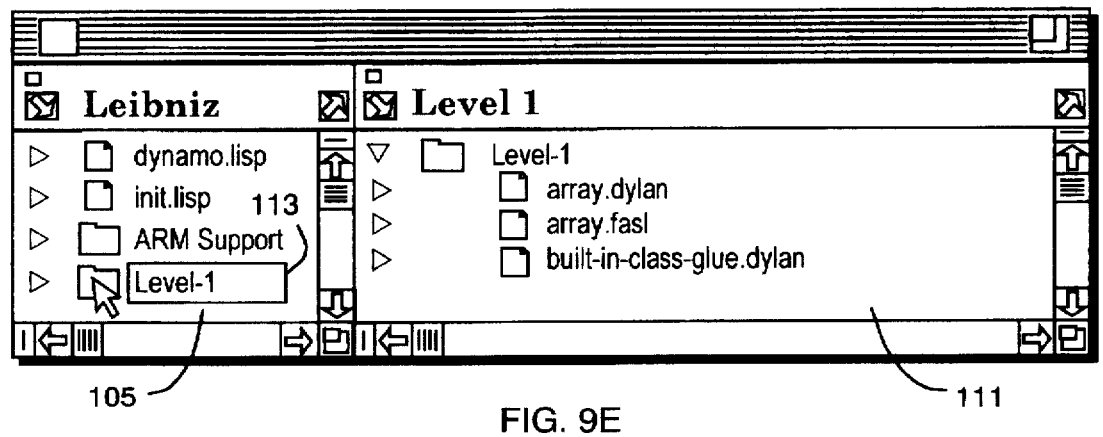

This is illustrated in FIGS. 9A–9E, which shows in FIG. 9A selection of the output icon 107 in pane 105, dragging the output icon 108 (FIG. 9B) and dropping on the split-bar icon 109 in the same pane 105 (FIG. 9C) causes the original display in pane 105 to continue in the left pane and to create a new second pane 111 (FIG. 9D) which displays the contents of the selected item ARM Support in the original pane 105. The new pane 111 is dynamically linked to the old pane 105, so making a new selection 113 (FIG. 9E) in pane 105 displays in new pane 111 the contents of the new selection Level 1. Further, the process depicted in FIGS. 3A–3D for displaying the contents of one or more selected objects in a first pane is not limited to an input icon in an existing second pane. The first and second panes can be in the same window or pane or in different windows or panes, and the first and second panes can even be the same pane.

As a further embodiment of the invention, in the same pane or window, selecting an object and dragging it to and dropping it on the input icon in that same pane or window will cause the contents of that object 111 to replace the original display in that window. Similarly, linking two existing panes as described in connection with FIGS. 4A–4E also applies to the same pane or to panes in different windows. As the selection in the first pane changes, the display in the pane containing the input icon changes.

Still further, as explained in connection with FIGS. 5A–5C, the invention is not limited to providing an inline editor when displaying the contents of an object inline. By selecting an object in a given pane, and issuing a command through the keyboard or mouse, the display of the object in the pane is replaced by a display of the contents of the object. The positions of other objects in the pane are changed to make room for the expanded view of the object originally selected. This feature is implemented as described by clicking on a special icon next to an object in a pane, such as the selected triangular icon 79 in FIG. 5A.

Figure 6:
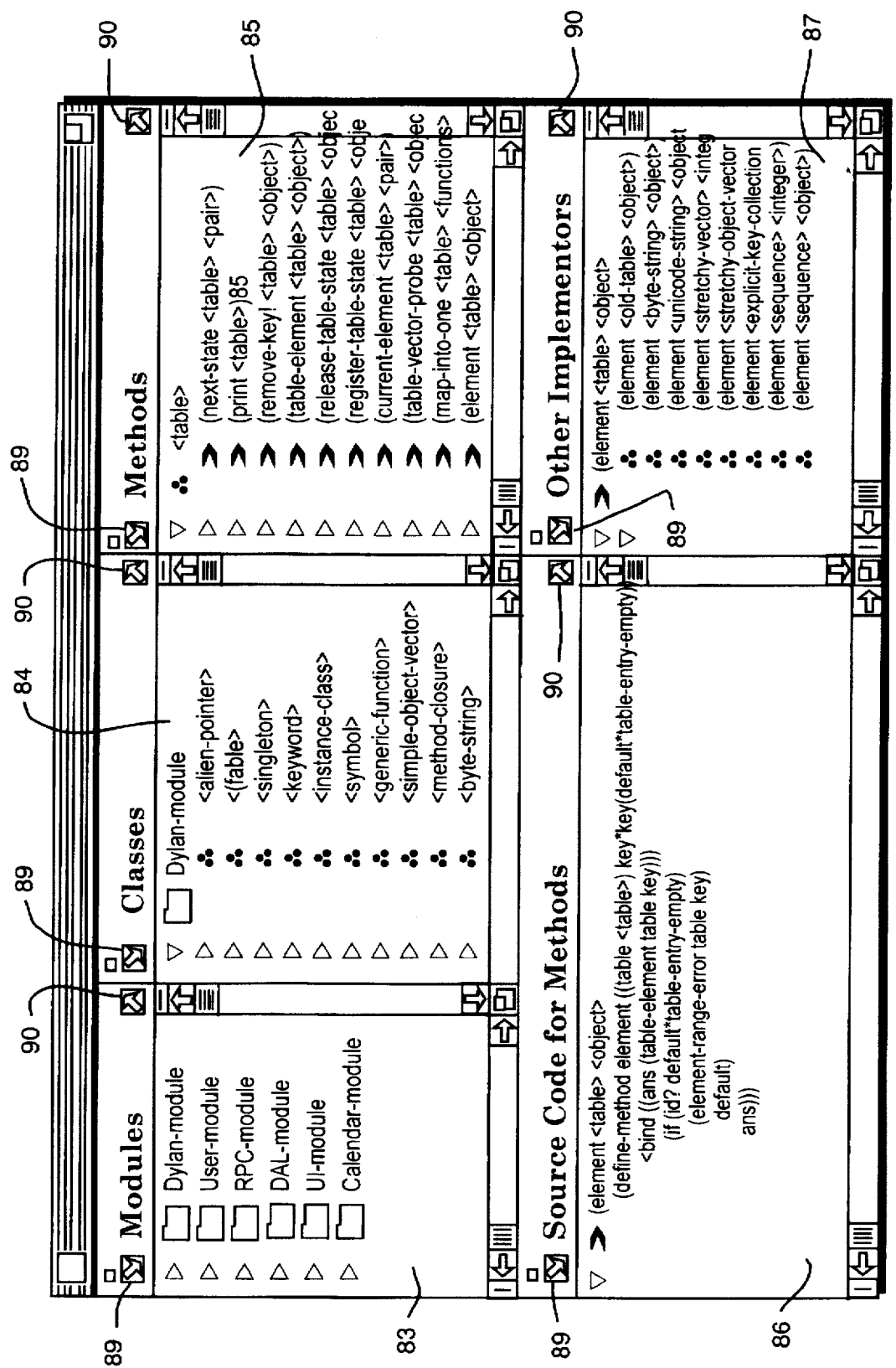
Figure 7:
Figure 8:
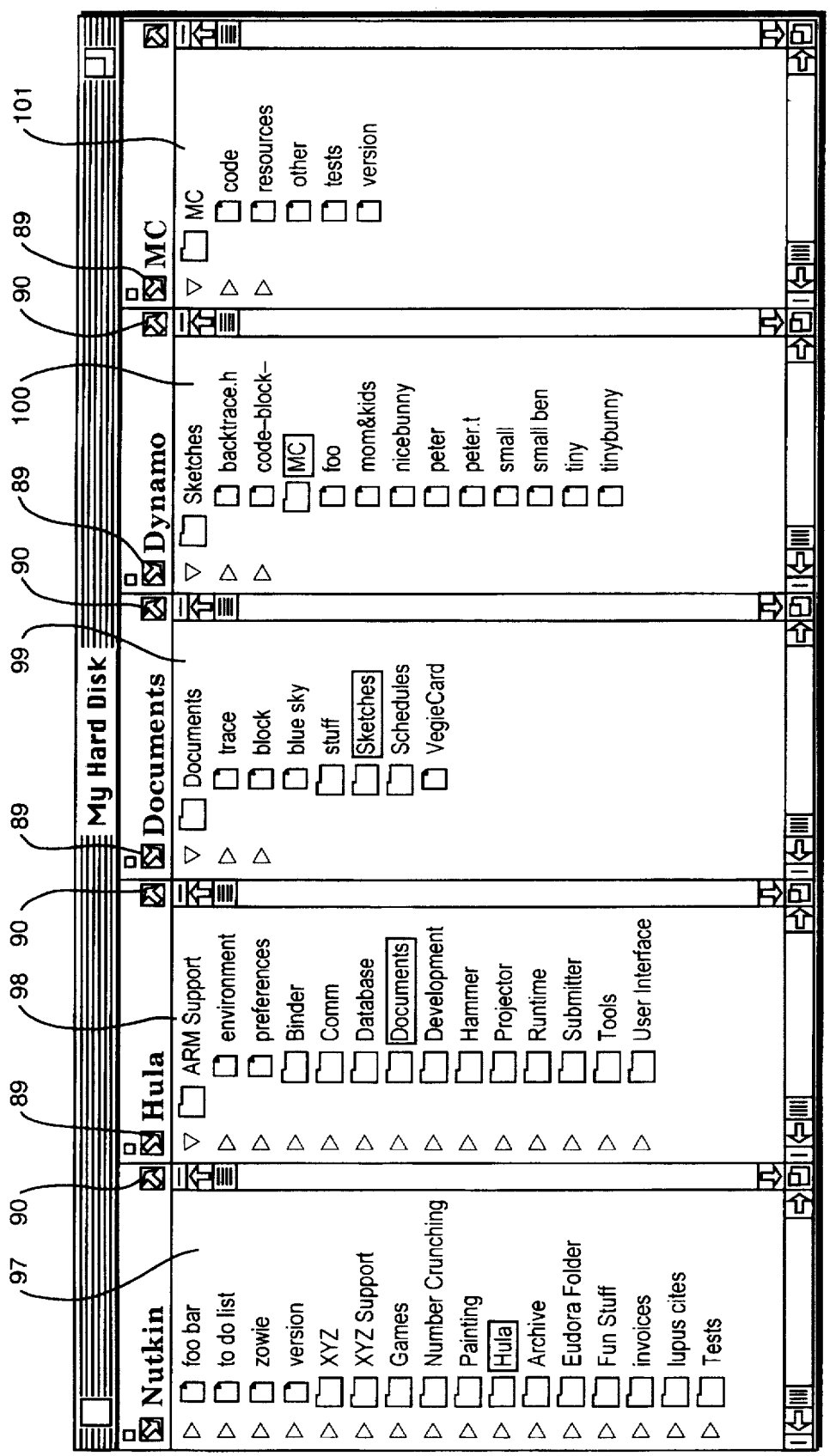

FIGS. 6–8 show several other ways in which the invention can provide important benefits to users. FIG. 6 is an example of how a programmer may use the invention, and shows 5 panes, 83–87, that can simultaneously be displayed on a single monitor screen. All the panes have been dynamically linked via their input 89 and output 90 icons, so that each pane in turn displays the contents of the object selected in the previous pane. The pane contents are as follows:

Pane 1(83): shows all the code modules associated with a given project;

Pane 2(84): shows all classes defined in the code module selected (shown highlighted) in Pane 1;

Pane 3(85): shows the methods defined on the class selected in Pane 2;

Pane 4(86): shows the source code of the method selected in Pane 3;

Pane 5(87): shows a list of other classes which implement the method selected in Pane 3.

This example also illustrates that one pane can drive more than one other pane. Note that both Panes 4 (86) and 5 (87) are driven by the selection in Pane 3.

FIG. 7 illustrates how the tools of the invention described herein are useful for general data browsing, and are not limited to program development. In the three panes 93–95 illustrated in FIG. 7,

- Pane 1(93): shows all the car models available at a given dealership;
- Pane 2(94): shows the options available for the car model selected in Pane 1;
- Pane 3(95): shows a description of the option selected in Pane 2.
- Pane 4(96): Pane 4 at the bottom is linked to Pane 1 and displays the selected car model.

FIG. 8 illustrates use of the invention for file location or management. In the five panes illustrated in FIG. 8:

- Pane 1(97): shows all the directories and files on a given hard disk;
- Pane 2(98): shows all the directories and files in the directory selected in Pane 1;
- Pane 3(99): shows all the directories and files in the directory selected in Pane 2;
- Pane 4(100): shows all the directories and files in the directory selected in Pane 3;
- Pane 5(101): shows all the directories and files in the directory selected in Pane 4.

In the examples illustrated in FIGS. 6, 7 and 8, the various panes are dynamically linked by, for example, as described above, dragging and dropping the output icon of one pane onto the input icon of another pane.

Figure 10A:
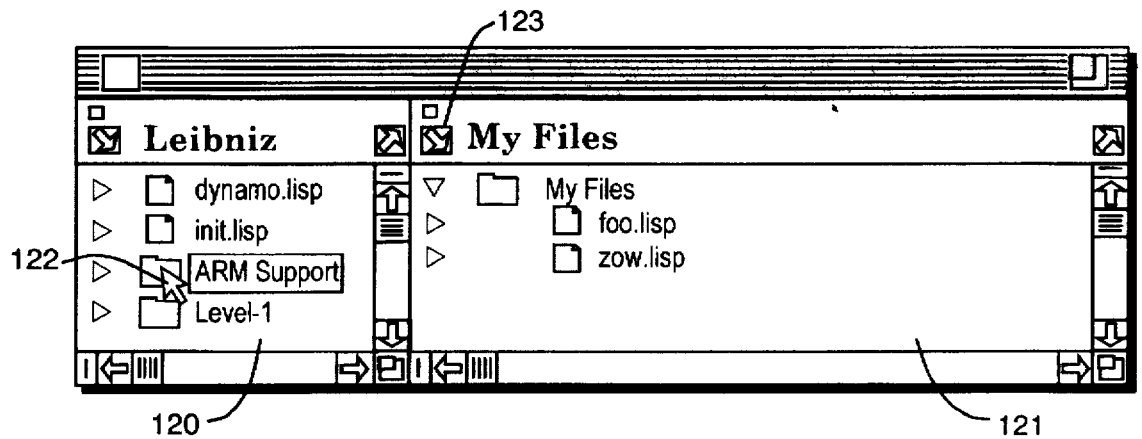
Figure 10B:
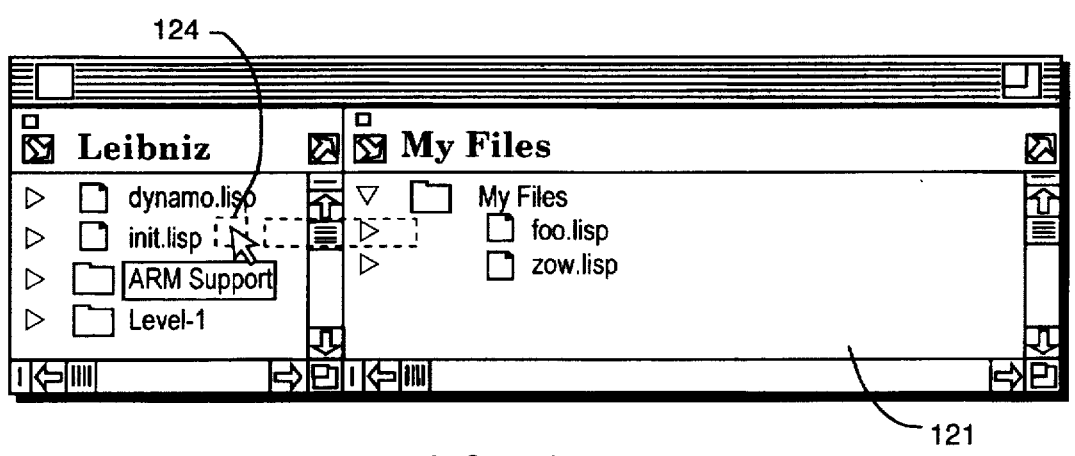
Figure 10C:
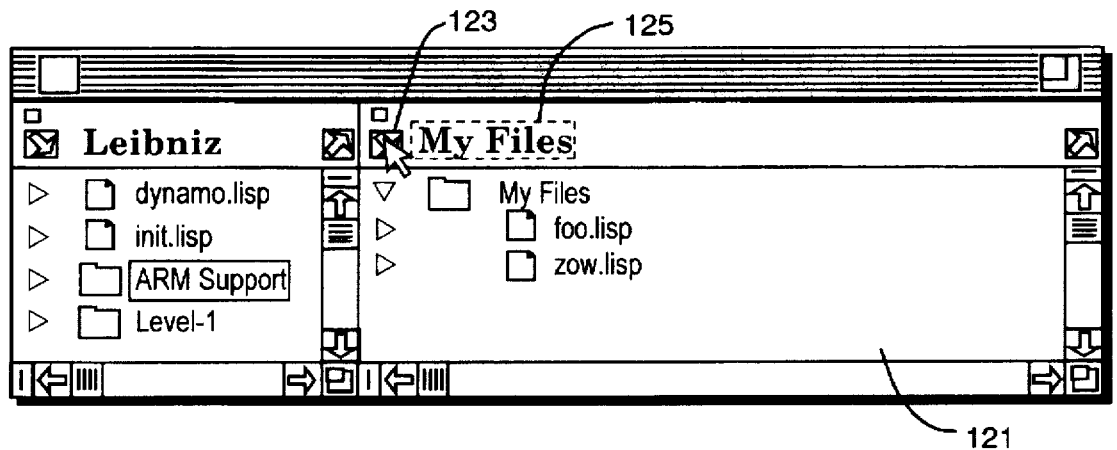
Figure 10D:
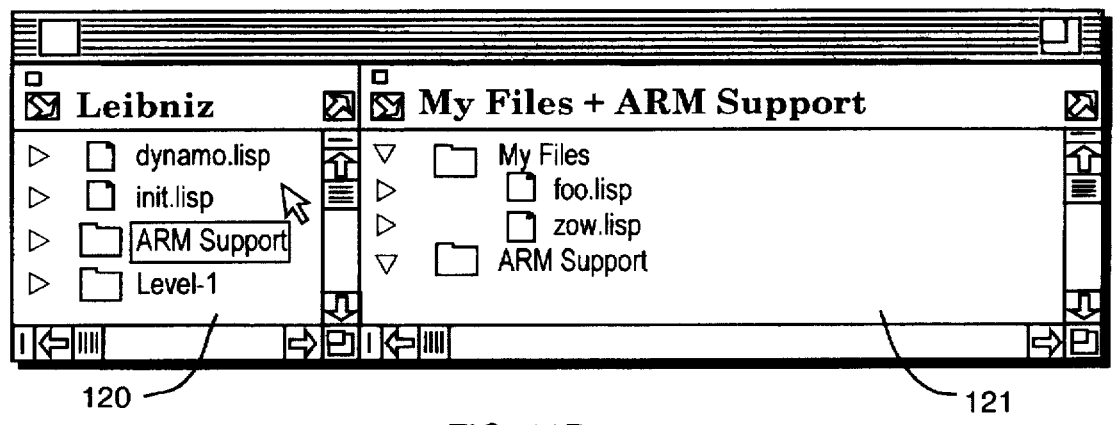

When dragging a new selected item to an input icon, if the pane associated with the input icon already contains one or more objects, two possible behaviours are possible: the new item may replace the old contents of the pane, or the new item may supplement the old contents of the pane. For example, if in FIG. 3C the right pane 66 had displayed objects, dragging and dropping the selected item 45A on the input box 56 could result in replacing the contents in the right pane 66 with the contents of the new selected item. FIGS. 10A–10D illustrates supplementing the old contents. In FIG. 10A, left pane 120 shows the contents of Leibniz, and right pane 121 shows the contents of My Files. When ARM Support is selected 122 (FIG. 10A) in the left pane, and dragged 124 (FIG. 10B) and dropped (FIG. 10C) on the input icon 123 in the right pane 121, the contents of pane 121 now displays both the contents of My Files and ARM Support. The choice between these two behaviours is easily made by the choice of the particular implementation of this feature of the invention, or both possibilities are easily implemented by providing separate routines for each, and allowing the user the option to select the behaviour desired. This variant of the invention involving two possible behaviours applies not only to dragging and dropping a selected displayed item on the input box, as shown in FIGS. 3A and 10C, but also to dragging and dropping the output box of one pane onto the input box of another pane, illustrated in FIG. 4C.

It will be noted that, though Panes 4(86) and 5(87) in FIG. 6 are linked to the same Pane 3(85), their displayed contents are different. This is to illustrate that opening up an item to display its contents can involve a display of one of several different objects or sets of objects related in some way to the item opened up. For instance, Pane 4(86) displays the code for one method for the class "table", whereas Pane 5(87) displays a number of other implementors for the "table" class. Where, as here, several possible displays exist when opening up an item, the choice can be left to the user determined by initial configuration or during use by issuing a supplemental command, such as by holding down a special key when selecting an item or when linking the panes. This is easily implemented by different routines each of which when invoked determines the displayed contents, the routine being invoked in turn being determined by a user action.

The manner of implementing the various features of the invention are straightforward and will be evident to those skilled in this act using well-known publications, such as Inside Macintosh, which provide analogous code routines for responding to cursor location and mouse clicks to provide functions, such as, to open up panes, to display contents of selected files, and to provide editors for windows or panes. No invention is believed necessary to implement those functions as described herein. Nevertheless, to assist those skilled in the art, what follows below is a listing of code modules or routines, labelled A–N which, when invoked in the proper order, will produce the functions corresponding to FIGS. 2A–2D, 3A–3D, 4A–4E and 5A–5C herein. The routines are:

A. Display-all
   Ask each window to display
B. Display Window
   Draw window frame
   Ask each pane in window to display
C. Display Pane
   Draw Pane Title Bar, input icon, output icon, split bar icons, scroll bars
D. Display domain object
   If domain object is open, display domain object contents
   If domain object is not open, display domain object title
E. Open domain object
   Set domain object opened state "open"
   Display-all
F. Close domain object
   Set domain object opened state "closed"
   Display-all
G. Select domain object
   Set domain object selection state "selected"
   Display-all
H. Unselect domain object
   Set domain object selection state "unselected"
   Display-all
I. Split for split-bar (argument)
   Shrink my pane
   Ask my window to add new pane
   Ask new pane to set display list according to (argument)
J. Set display list pane (argument)
   If (argument) is a domain object, set display-list state to domain object
   If (argument) is an outbox, set display-list state to link to selection of pane of outbox
K. Process-click twist-triangle
   If my domain object is open, ask my domain to close
   If my domain object is closed, ask my domain object to open
   Display-all
L. Process-click split-bar icon
   Drag until release
   Split for my domain objects
M. Process-click domain object

```
If object is open, edit object, otherwise:
    Drag until release
    If release in my pane, ask domain object to select
    If release in any split-bar, ask split-bar to split for
        domain object
    If release in any inbox, ask pane of inbox to set display
        list according to domain object
    Display-all
N. Process-click outbox
    Drag until release
    If release in any split-bar, ask split-bar to split for
        outbox
    If release in any inbox, ask pane of inbox to set display
        list according to outbox
    Display-all
```

The routines A–N will be invoked in a certain sequence, indicated below following receipt of a mouse click over an icon or object. The indentation indicates nested subroutines.

```
Routine invocation corresponding to FIGS. 2A–2D
Routine M
    Routine I
        Routine J
            Routine A
                Routine B
                Routine C
                Routine D
Routine invocation corresponding to FIGS. 3A–3D
Routine M
    Routine J
        Routine A
            Routine B
            Routine C
            Routine D
Routine invocation corresponding to FIGS. 4A–4E
Routine N
    Routine J
        Routine A
            Routine B
            Routine C
            Routine D
Routine invocation corresponding to FIGS. 5A–5C
Routine K
    Routine E
        Routine A
            Routine B
            Routine C
            Routine D
```

The advantages of the invention include allowing users to create in a relatively simple way their own views on the stored data, by opening new panes to view, and edit if desired, the structure of objects in an old pane which continues to display its original data. Moreover, it also affords a simple and quick way for a user to browse or navigate through a sequence of nested objects.

An important benefit of the invention is that a small number of additional user interface elements provides a relatively large number of valuable desktop functions, such as, splitting a pane and simultaneously determining which object is displayed in the newly created pane, splitting a pane and simultaneously linking it to another pane, specifying that the contents of an object or group of objects should be displayed in an existing pane, linking two or more existing panes, and displaying the contents of an object inline.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. This scope of the invention is indicated by the appended claims rather than by the foregoing description.

What is claimed is:

1. An interactive user interface of a computer including a monitor for displaying objects of said computer on a screen, said interface comprising:

a window of the screen, said window configured for apportionment into a plurality of panes, a first pane having a content region for displaying said objects;

control means located within a first control region of said first pane and within a second control region of a second pane of said window for linking a selected object of said first pane to said second pane; and means for dragging said selected object from said content region of said first pane to one of said first and second control regions and dropping said object onto said control means, such that said control means, in response to said dropped object, links said selected object to said second pane to thereby enable automatic viewing of contents of said selected object on said second pane.

2. The interactive user interface of claim 1 wherein control means comprises an input icon control of said second pane.

3. The interactive user interface of claim 2 wherein said dragging means comprises a mouse.

4. The interactive user interface of claim 1 wherein said control means comprises a split-bar box of said first pane.

5. The interactive user interface of claim 4 wherein said dragging means comprises a mouse.

6. A method for enabling a user to view contents of objects displayed on a screen of a computer, the screen having a window configured for apportionment into a plurality of panes for displaying said objects, said method comprising the steps of:

selecting at least one of said objects displayed on a first pane using a pointer controlled by the user;

dragging said selected object onto an icon control of one of said first pane and a second pane using the pointer; and linking said selected object to said second pane to enable viewing of contents of said selected object on said second pane.

7. The method of claim 6 wherein said icon control comprises a split-bar box of said first pane and wherein said method further comprises the step of creating, in response to said dragging step, said second pane for viewing the contents of said selected object without affecting the arrangement of objects displayed on said first pane.

8. The method of claim 6 wherein said icon control comprises an input icon of said second pane and wherein said method further comprises the step of changing, in response to said dragging step, information displayed on said second pane to enable viewing of the contents of said selected object.

9. Apparatus for displaying objects of a computer, the apparatus comprising:

a monitor coupled to the computer, the monitor having a window displayed on a screen thereof, the window configured for apportionment into a first pane having a first control region and a first content region, and a second pane having a second control region and a second content region;

a processor operably connected to the monitor and programmed to generate control means contained within the control regions of the panes for linking a selected object of the first pane to the second pane to enable automatic viewing of said selected object on said second pane in response to dragging the selected object from the first content region of the first pane to one of the first and second control regions and dropping the selected object onto the control means; and a memory operably connected to the processor for storing the control means contained within the control regions of the panes.

10. The apparatus of claim 9 wherein the control means comprises an input icon control of the second pane.

11. The apparatus of claim 9 wherein the control means comprises a split-bar box of the first pane.

12. A computer readable medium containing program instructions for:

selecting an object displayed on a first pane of a computer screen window using a pointer controlled by the user;

dragging the selected object onto an icon control of one of the first pane and a second pane of the window using the pointer; and linking the selected object to the second pane to enable automatic viewing of contents of the selected object on the second pane.

13. The medium of claim 12 wherein the icon control comprises a split-bar box of the first pane and wherein the medium further contains program instructions for creating, in response to the dragging step, the second pane for viewing the contents of the selected object without affecting the arrangement of objects displayed on the first pane.

14. The medium of claim 12 wherein the icon control comprises an input icon of the second pane and wherein the medium further contains program instructions for changing, in response to the dragging step, information displayed on the second pane to enable viewing of the contents of the selected object.

* * * * *